(12) United States Patent
Shalaby et al.

(10) Patent No.: US 12,480,789 B1
(45) Date of Patent: Nov. 25, 2025

(54) HYBRID FREE SPACE OSCILLATORS FOR ULTRAPRECISION SENSOR APPLICATIONS

(71) Applicant: IMAM MOHAMMAD IBN SAUD ISLAMIC UNIVERSITY, Riyadh (SA)

(72) Inventors: Mohamed Yehia Mohamed Shalaby, Riyadh (SA); Abdulrahman M. Shalaby, Kajang (MY)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/056,155

(22) Filed: Feb. 18, 2025

(51) Int. Cl.
*G01C 9/02* (2006.01)
*G01D 5/353* (2006.01)

(52) U.S. Cl.
CPC ........... *G01D 5/35329* (2013.01); *G01C 9/02* (2013.01)

(58) Field of Classification Search
None
See application file for complete search history.

(56) References Cited

U.S. PATENT DOCUMENTS

| | | | | |
|---|---|---|---|---|
| 5,777,778 A * | 7/1998 | Yao | ........................ | G02F 1/0123 359/245 |
| 7,492,795 B1 * | 2/2009 | Delfyett | .................. | H01S 3/136 372/18 |
| 10,454,421 B2 | 10/2019 | Nicholls | | |

(Continued)

FOREIGN PATENT DOCUMENTS

| | | | | |
|---|---|---|---|---|
| EP | 4446711 A1 * | 10/2024 | ......... | G01D 5/35358 |
| GB | 2262983 A * | 7/1993 | ............. | G01B 11/18 |

(Continued)

OTHER PUBLICATIONS

Yosef London, et al., "Electro-opto-mechanical radio-frequency oscillator driven by guided acoustic waves in standard single-mode fiber", APL Photonics, vol. 2, Issue 4, Mar. 9, 2017, pp. 041303-1 to 041303-7, 8 pages.

*Primary Examiner* — Michelle M Iacoletti
*Assistant Examiner* — Maher Yazback
(74) *Attorney, Agent, or Firm* — Oblon, McClelland, Maier & Neustadt, L.L.P.

(57) ABSTRACT

A free space optical oscillator system for sensing perturbations in optical signals transmitted through a free space propagation region includes a laser diode which generates intensity-modulated optical signals. A first 50/50 directional coupler connected to the laser diode injects the intensity-modulated optical signals into an optical sensing path. A free space propagation region located between a first and second collimating lens generates phase shifts in the intensity-modulated optical signals upon detecting changes in a substance located within a sensing zone of the free space propagation region. A semiconductor optical amplifier (SOA) amplifies the phase shifted intensity-modulated optical signals. A phase shift loop, connected between a second 50/50 directional coupler and the first 50/50 directional coupler, inserts a fixed phase shift into the amplified phase shifted intensity-modulated optical signals through a piezoelectric (PZT) fiber stretcher. A measurement loop converts the phase-shifted amplified intensity-modulated optical signals to electrical signals using a photodetector.

11 Claims, 11 Drawing Sheets

(56) References Cited

U.S. PATENT DOCUMENTS

| | | | |
|---|---|---|---|
| 11,644,301 B1 * | 5/2023 | Katzenmeyer | G01B 9/02067 |
| | | | 356/477 |
| 11,855,416 B2 | 12/2023 | Yoffe | |
| 2005/0057791 A1 * | 3/2005 | Sayyah | H03L 7/099 |
| | | | 359/245 |
| 2005/0248823 A1 * | 11/2005 | Maleki | H04B 10/2575 |
| | | | 359/245 |
| 2006/0109476 A1 * | 5/2006 | Werner | G01B 9/02058 |
| | | | 356/477 |
| 2010/0085992 A1 * | 4/2010 | Rakuljic | G01S 7/4911 |
| | | | 372/20 |
| 2021/0018814 A1 * | 1/2021 | Gowda | H04J 14/08 |
| 2022/0352687 A1 | 11/2022 | Shafak et al. | |
| 2024/0019296 A1 * | 1/2024 | Mills | G01L 1/242 |
| 2025/0116601 A1 * | 4/2025 | Rieker | G01N 21/39 |

FOREIGN PATENT DOCUMENTS

| | | | | |
|---|---|---|---|---|
| WO | WO-2006099616 A2 * | 9/2006 | | G01C 19/72 |
| WO | WO-2022067215 A1 * | 3/2022 | | A61B 3/102 |

* cited by examiner

HYBRID FREE SPACE OSCILLATORS FOR ULTRAPRECISION SENSOR APPLICATIONS

CROSS REFERENCE TO RELATED APPLICATIONS

The present application is related to "Ultraprecision Frequency-Domain Lidar System for Remote Micro-Movement Sensing", filed on Feb. 18, 2025, and to "Compact Fiber Optic Gyroscope With Feedback-Enhanced Frequency Interferometry For Precision Measurement", U.S. application Ser. No. 19/035,744, filed on Jan. 23, 2025, which are incorporated herein by reference in their entirety.

BACKGROUND

Technical Field

The present disclosure is directed to optical systems and, more particularly, to a system and a method for a free space optical oscillator for sensing perturbations in optical signals transmitted through a free space propagation region.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In various industrial, environmental, and infrastructure sectors, accurate and reliable monitoring of physical parameters (e.g., thickness, temperature, pressure, and structural integrity) is expected. While traditional sensing technologies have been effective to some degree, they often come with notable limitations that hinder their widespread, safe adoption. Conventional sensors that measure signal amplitude or phase along a single trajectory between the transmitter and receiver frequently lack the sensitivity required to detect subtle changes in the medium being analyzed.

Many conventional thickness and structural monitoring systems rely on nuclear radiation sources, such as gamma rays, to penetrate materials and assess their properties. The nuclear radiation based systems present inherent health risks due to radiation exposure, requiring strict safety protocols and limiting their use in environments where human safety is a top priority. The use of radioactive materials is tightly regulated, limiting deployment in certain regions and complicating disposal and maintenance. These constraints hinder the flexibility and scalability of nuclear-based sensing technologies.

Conventional non-nuclear sensors (e.g., ultrasonic or optical systems) are not often effective to detect small changes in material properties. The sensitivity of the conventional non-nuclear sensors may be insufficient for applications requiring high precision, which can lead to missed detection of critical defects or environmental variations. Maintaining accurate calibration over time may be difficult with the nuclear-based sensors, as factors (e.g., component aging) can degrade performance, reducing reliability and requiring frequent recalibrations.

Advanced sensing systems often require complicated set-ups and significant operational and maintenance expenses. Such challenges make the advanced sensing systems less accessible for broad industrial use, particularly in cost-sensitive applications. In applications (e.g., structural health monitoring and process control), having a high-resolution sensing system is crucial for detecting issues at early stages and preventing larger, more costly problems down the line.

U.S. Pat. No. 10,454,421B2 describes an optoelectronic oscillator electronically tunable filter for transposing narrow pass band characteristics of a surface acoustic wave (SAW) filter to a microwave frequency. A laser is connected to a Mach-Zehnder modulator which transmits the laser signal through an optical delay element. A photodetector receives the laser signal and transmits it through a feedback path comprising an amplifier, a bandpass filter and a voltage-controlled phase shifter. This circuit does not include a parallel phase shift path and is used to tune a frequency of the microwave transmitter and is not used for sensing.

U.S. Pat. No. 11,855,416B2 describes a laser for a distributed fiber sensing system comprising a Mach-Zehnder interferometer. The PLC frequency discriminator contains a Mach-Zehnder interferometer. The Mach-Zehnder interferometer comprises an optical delay element connected between two photodetectors. A parallel path includes a phase shifter and a waveguide delay line. The Mach-Zehnder interferometer having a signal input split into two arms by a first 3 dB coupling, with two outputs from a second 3 dB coupling at the end of the arms. The two outputs from the second 3 dB coupling may be provided to photodetectors, with outputs of the photodetectors used as an electrical output signal of the frequency discriminator. The asymmetry due to the delay line creates a transmission spectrum roughly periodic in wavelength. A phase shifter in one arm provides precise tuning of the interferometer to the wavelength of the laser. However, this circuit is used to tune the laser and does not include a free space path that can be used for sensing.

Non-patent result "Electro-opto-mechanical radio-frequency oscillator driven by guided acoustic waves in standard single-mode fiber" describes an opto-electronic radio-frequency oscillator that is based on forward scattering by the guided acoustic modes of a standard single-mode optical fiber is proposed and demonstrated. An optical pump wave is used to stimulate narrowband, resonant guided acoustic modes, which introduce phase modulation to a co-propagating optical probe wave. This reference appears to have probes for sensing but does not appear to include the change in frequency or phase shift in the feedback loop.

Each of these references suffers from one or more limitations that hinder the detection of small changes in material properties. Their sensitivity may not be sufficient for applications requiring high precision (e.g., environmental monitoring, precision metrology, and industrial sensing). Accordingly, it is one object of the present disclosure to provide a system and method for overcoming the limitations of conventional approaches by converting small phase shifts into significant, measurable frequency changes, which significantly improve detection accuracy.

SUMMARY

In an exemplary embodiment, a free space optical oscillator system for sensing perturbations in optical signals transmitted through a free space propagation region, includes a laser diode connected to a power source, where the laser diode is configured to generate intensity-modulated optical signals, a first 50/50 directional coupler connected to the laser diode, where the first 50/50 directional coupler is configured to inject the intensity-modulated optical signals into an optical sensing path, a first collimating lens located on the optical sensing path, a second collimating lens located on the optical sensing path, a free space propagation region located between the first collimating lens and the second collimating lens, wherein changes in a substance located within a sensing zone of the free space propagation region generate phase shifts in the intensity-modulated optical signals, a semiconductor optical amplifier (SOA) connected to the second collimating lens, where the SOA is configured to amplify the phase shifted intensity-modulated optical signals, a second 50/50 directional coupler connected to the SOA, where the second 50/50 directional coupler is configured to receive the amplified phase shifted intensity-modulated optical signals, a phase shift loop connected between the second 50/50 directional coupler and the first 50/50 directional coupler, where the phase shift loop includes a fiber delay line in series with a piezoelectric (PZT) fiber stretcher, where the PZT fiber stretcher is configured to insert a fixed phase shift into the amplified phase shifted intensity-modulated optical signals, a measurement loop connected between the second 50/50 directional coupler and the laser diode, where the measurement loop includes a photodetector configured to convert the phase shifted amplified intensity-modulated optical signals to electrical signals, and an electrical amplifier, a tunable bandpass filter and a variable electrical phase shifter configured to amplify and filter the electrical signals, a spectrum analyzer connected to the measurement loop, where the spectrum analyzer is configured to receive the amplified, filtered, electrical signals, generate a frequency spectrum, and determine one or more frequency shifts between the amplified, filtered, electrical signals and a reference frequency, and a computing device connected to the spectrum analyzer, where the computing device includes an electrical circuitry, a memory having program instructions stored therein that, when executed by one or more processors, cause the one or more processors to: receive the frequency shifts and the frequency spectrum, compare the one or more frequency shifts to a look-up table configured to relate the one or more of the frequency shifts to the phase shifts generated within the sensing zone by the changes in the substance, and identify the changes in the substance.

In another exemplary embodiment, a method for sensing perturbations in a free space propagation region of a free space oscillator, includes generating, by a laser diode connected to a power source, intensity-modulated optical signals, injecting, with a first 50/50 directional coupler connected to the laser diode, the intensity-modulated optical signals onto an optical sensing path, transmitting, through a first collimating lens located on the optical sensing path, the intensity-modulated optical signals into the free space propagation region, where changes in a substance located within a sensing zone of the free space propagation region generate phase shifts in the intensity-modulated optical signals, receiving, by a second collimating lens located on the optical sensing path at a position downstream of the free space free space propagation region, the phase shifted intensity-modulated optical signals, receiving and amplifying, by a semiconductor optical amplifier (SOA) connected to the second collimating lens, the phase shifted intensity-modulated optical signals, receiving, by a second 50/50 directional coupler connected to the SOA, the amplified phase shifted intensity-modulated optical signals, injecting, by the second 50/50 directional coupler, the amplified phase shifted intensity-modulated optical signals into a phase shift loop connected between the second 50/50 directional coupler and the first 50/50 directional coupler, injecting, by a fiber delay line in series with a piezoelectric (PZT) fiber stretcher in the phase shift loop, a fixed phase shift into the phase shifted amplified intensity-modulated optical signals, receiving, by a measurement loop connected between the second 50/50 directional coupler and the laser diode, the phase shifted amplified intensity-modulated signals, converting, by a photodetector located in the measurement loop, the phase shifted amplified intensity-modulated optical signals to electrical signals, where frequency shifts of the electrical signals vary based on the phase shifts generated within the sensing zone by the changes in the substance, amplifying, by an electrical amplifier, the electrical signals, filtering, by a tunable bandpass filter and a variable electrical phase shifter, the electrical signals, receiving, by a spectrum analyzer connected to the measurement loop, the amplified, filtered, electrical signals, generating, with the spectrum analyzer, a frequency spectrum of the amplified, filtered, electrical signals, determining, by the spectrum analyzer, the frequency shifts within the frequency spectrum, receiving, by a computing device including an electrical circuitry, a memory having program instructions stored therein that, and one or more processors configured to execute the program instructions, the frequency shifts, comparing, by the computing device, the frequency shifts to a look-up table configured to relate the frequency shifts to the phase shifts generated within the sensing zone by the changes in the substance, and identifying the changes in the substance.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
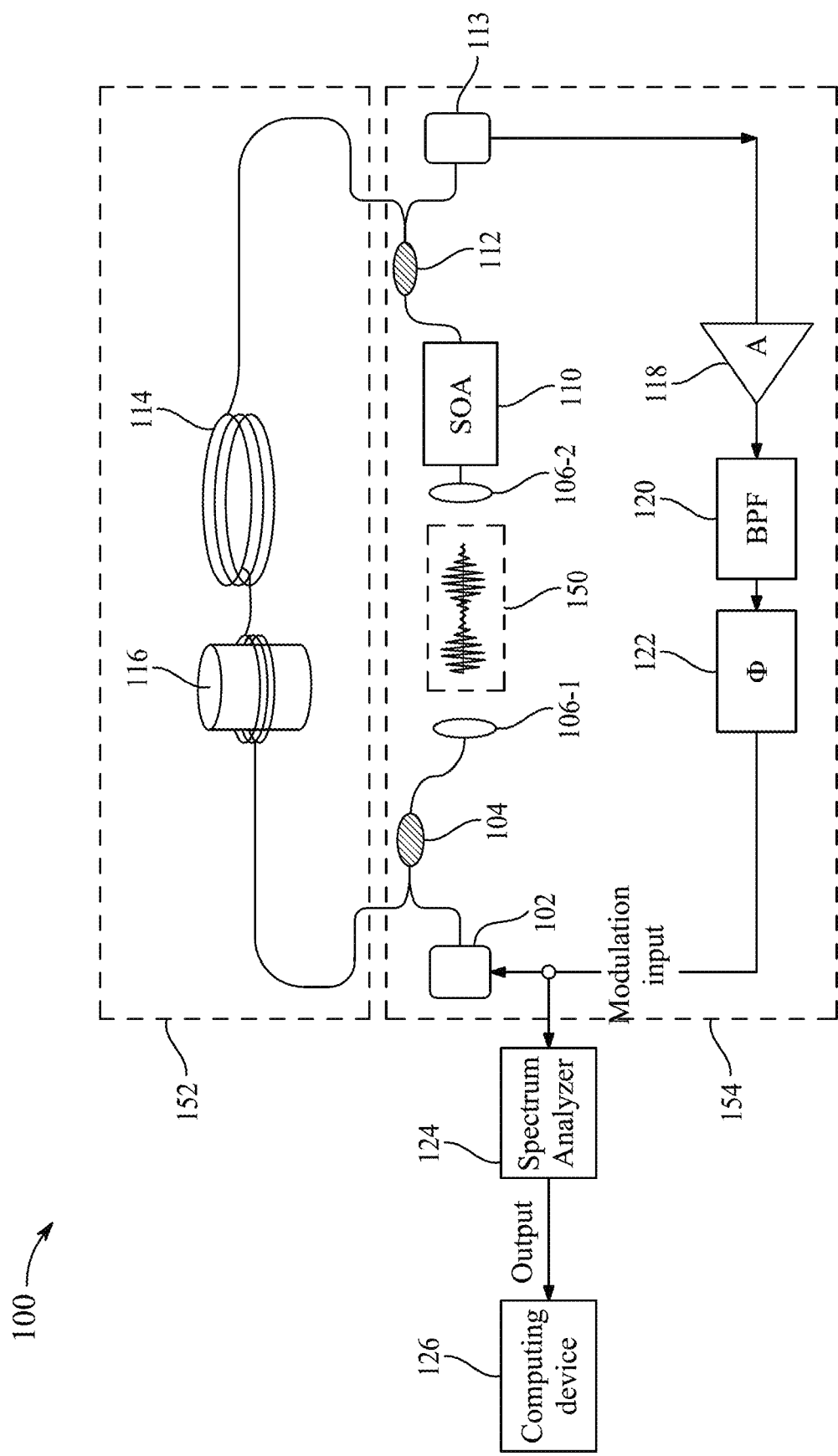
FIG. 1 illustrates a block diagram of an optoelectronic oscillator, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for a free space optical oscillator for sensing perturbations in optical signals transmitted through a free space propagation region. The free-space optical oscillator addresses limitations of conventional sensing technologies by providing a high-sensitivity, safe, and robust solution for monitoring various environmental and structural parameters. The free-space optical oscillator uses optical oscillations combined with a feedback mechanism and offers a technically enhanced alternative to conventional nuclear-based and other conventional non-nuclear sensors. The free-space optical oscillator enhances safety and operational efficiency, broadening a scope of applications across various industries, making it a significant advancement in the field of environmental and structural monitoring.

The present disclosure relates to a system and a method that employs a free space optical oscillator for sensing perturbations in optical signals transmitted through a free space propagation region. The free space optical oscillator comprises a laser diode connected to a power source is configured to generate intensity-modulated optical signals. A first 50/50 directional coupler connected to the laser diode is configured to inject the intensity-modulated optical signals into an optical sensing path. A free space propagation region is located between a first collimating lens and a second collimating lens. Changes in a substance located within a sensing zone of the free space propagation region generate phase shifts in the intensity-modulated optical signals. A semiconductor optical amplifier (SOA) connected to the second collimating lens is configured to amplify the phase shifted intensity-modulated optical signals. A second 50/50 directional coupler connected to the SOA is configured to receive the amplified phase shifted intensity-modulated optical signals. A phase shift loop is connected between the second 50/50 directional coupler and the first 50/50 directional coupler. The phase shift loop includes a fiber delay line in series with a piezoelectric (PZT) fiber stretcher. The PZT fiber stretcher is configured to insert a fixed phase shift into the amplified phase shifted intensity-modulated optical signals. A measurement loop is connected between the second 50/50 directional coupler and the laser diode. The measurement loop includes a photodetector configured to convert the phase shifted amplified intensity-modulated optical signals to electrical signals, and an electrical amplifier, a tunable bandpass filter and a variable electrical phase shifter configured to amplify and filter the electrical signals. A spectrum analyzer connected to the measurement loop is configured to receive the amplified, filtered, electrical signals, generate a frequency spectrum, and determine one or more frequency shifts between the amplified, filtered, electrical signals and a reference frequency. A computing device is connected to the spectrum analyzer. The computing device receives the frequency shifts and the frequency spectrum. The computing device compares the one or more frequency shifts to a look-up table configured to relate the one or more of the frequency shifts to the phase shifts generated within the sensing zone by the changes in the substance and identifies the changes in the substance.

FIG. 1 illustrates an exemplary configuration of a free space optical oscillator 100 for sensing perturbations in optical signals transmitted through a free space propagation region.

The free space optical oscillator 100 comprises a laser diode 102, a first 50/50 directional coupler 104, a first collimating lens 106-1, a second collimating lens 106-2, a semiconductor optical amplifier (SOA) 110, a second 50/50 directional coupler 112, a phase shift loop 152, a measurement loop 154, a spectrum analyzer 124 and a computing device 126.

The laser diode 102 is connected to a power source and is configured to generate intensity-modulated optical signals. In an example, the laser diode 102 may be a pigtailed laser diode. The pigtail laser diode refers to a laser diode with an optical fiber mounted at a defined position. The term 'pigtail' with regards to the pigtail laser diode relates to an optical fiber being fused or connected to the laser diode, providing a convenient way to couple a light output from the laser diode 102 into the optic fiber for transmission. The first 50/50 directional coupler (DC) 104 is connected to the laser diode 102. The first 50/50 directional coupler 104 is configured to inject the intensity-modulated optical signals into an optical sensing path. The optical sensing path includes the first collimating lens 106-1 and the second collimating lens 106-2. In examples, the collimating lens are optical lens designed to convert divergent or convergent light rays into a collimated beam(s).

A free space propagation region 150 is located between the first collimating lens 106-1 and the second collimating lens 106-2. The free space propagation region 150 provides space for substances to be placed. In aspects, any changes in a substance of the sample located within a sensing zone of the free space propagation region 150 generate phase shifts in the intensity-modulated optical signals. The SOA 110 is coupled to the second collimating lens 106-2. In one aspect, the SOA 110 may be a semiconductor element that amplifies light. In some examples, antireflective coatings are applied on both facets of a semiconductor element to eliminate a resonator structure. When light enters from outside the semiconductor, it is amplified by stimulated emission. The SOA 110 is configured to amplify the phase shifted intensity-modulated optical signals. Examples of the SOA 110 may include but are not limited to, a traveling-wave semiconductor optical amplifier (TW-SOA), a reflective semiconductor optical amplifier (RSOA), an electro-absorption modulated SOA (EAM-SOA), and a quantum-dot semiconductor optical amplifier (QD-SOA). The SOA 110 compensates for signal power loss in the free space propagation region 150. The second 50/50 directional coupler 112 is connected to the SOA 110. The second 50/50 directional coupler 112 is configured to receive the amplified phase shifted intensity-modulated optical signals.

The phase shift loop 152 is connected between the second 50/50 directional coupler and the first 50/50 directional coupler. The phase shift loop 152 is an additional optical feedback path created using a fiber delay line 114 and a variable phase shifter element (referred to as piezo-transducer PZT fiber stretcher). The fiber delay line 114 in series with the piezoelectric (PZT) fiber stretcher 116. In an aspect, the fiber delay line 114 refers to a device that introduces a controlled delay to an optical signal as it travels through an optical fiber. The fiber delay line 114 uses a length of optical fiber to delay the signal by a defined amount of time (measured in nanoseconds or microseconds). The delay may be determined by the length of the fiber and the propagation speed of light within the optical fiber. The fiber delay line 106 provides stability against phase noise. The fiber delay line 114 is configured to inject the fixed phase shift into the phase shift loop 152. The PZT fiber stretcher 116 is configured to insert a fixed phase shift into the amplified phase shifted intensity-modulated optical signals. In aspects, the PZT fiber stretcher 116 includes an optical fiber wound around a piezoelectric tube and a voltage source connected to the piezoelectric tube. The piezoelectric tube is configured to inject the fixed phase shift into the phase shift loop by expanding a path length of the optical fiber by increasing in diameter based on a magnitude of a voltage applied by the voltage source to the piezoelectric tube. The phase shift generated by the PZT fiber stretcher 116 is set during calibration of the free space optical oscillator 100.

The measurement loop 154 is connected between the second 50/50 directional coupler 112 and the laser diode 102. The measurement loop 154 includes a photodetector 113, an electrical amplifier 118, a tunable bandpass filter 120 and a variable electrical phase shifter 122. The photodetector 113 is configured to convert the phase shifted amplified intensity-modulated optical signals to electrical signals. The electrical amplifier 118 is configured to amplify the electrical signals. The tunable bandpass filter 120 is configured to pass a defined frequency spectrum of electrical signals from electrical signals received from the photodetector 113. The tunable bandpass filter 120 is a type of filter that allows electrical signals within a specific frequency range (band) to pass through while rejecting frequencies outside that range. A center frequency and/or bandwidth is tunable be adjusted dynamically to suit different applications. The variable electrical phase shifter 122 is configured to amplify and filter the electrical signals. In examples, the variable electrical phase shifter refers to a device used to adjust the phase of an electrical or optical signal in a controlled and variable manner. In examples, the phase shift can be fine-tuned, allowing precise manipulation of timing, synchronization, or alignment of the signal. The amplified, filtered, electrical signals from the measurement loop 154 are configured to modulate the power from the power source applied to the laser diode 102.

The spectrum analyzer 124 is connected to the measurement loop 154. In examples, the spectrum analyzer 124 refers to a device that measures and displays signal amplitude (strength) as it varies by frequency within its frequency range (spectrum). The spectrum analyzer 124 is configured to receive the amplified, filtered, electrical signals, generate a frequency spectrum, and determine one or more frequency shifts between the amplified, filtered, electrical signals and a reference frequency. The amplified, filtered, electrical signals are used for modulating the power supplied to the laser diode 102. The computing device 126 connected to the spectrum analyzer 124, includes an electrical circuitry, a memory having program instructions stored therein that, when executed by one or more processors, cause the one or more processors to receive the frequency shifts and the frequency spectrum, compare the one or more frequency shifts to a look-up table configured to relate the one or more of the frequency shifts to the phase shifts generated within the sensing zone by the changes in the substance, and identify the changes in the substance.

In operation, the laser diode 102 generates intensity-modulated optical signals. The first 50/50 directional coupler 104 receives the intensity-modulated optical signals from the laser diode 102 and divides the intensity-modulated optical signals into a first optical stream and a second optical stream. The first 50/50 directional coupler 104 injects the intensity-modulated optical signals onto the optical sensing path. The first collimating lens 106-1 transmits the intensity-modulated optical signals into the free space propagation region 150. The free space propagation region 150 is a sensing region where the substances are placed for measurement. Any changes in a substance located within a sensing zone of the free space propagation region 150 generates phase shifts in the intensity-modulated optical signals. According to FIG. 1, the substance may be a medium, such as gas, glass, plasma, etc. The mediums may cause perturbations in the free space propagation region are due to changes in a density of a gas, temperature of a gas, etc. In aspects, a wave of frequency ω undergoes phase shift φ when it traverses a medium of length L given by, $$\varphi = \frac{2\pi}{\lambda}\sqrt{\epsilon_r}L = \frac{\omega}{v}L, \qquad (1)$$

where $\epsilon_r$, and v are dielectric constant of the medium and wave speed in that medium that vary according to changes in medium characteristics such as temperature, density, pressure, and the like.

The second collimating lens 106-2 located in the optical sensing path at a position downstream of the free space free space propagation receives the phase shifted intensity-modulated optical signals from the free space propagation region 150. The SOA 110 receives and amplifies the phase shifted intensity-modulated optical signals from the second collimating lens 106-2. The second 50/50 directional coupler 112 connected to the SOA 110 receives the amplified phase shifted intensity-modulated optical signals. The second 50/50 directional coupler 112 injects the amplified phase shifted intensity-modulated optical signals into the phase shift loop 152. The fiber delay line 114 in series with the PZT fiber stretcher 116 injects a fixed phase shift into the phase shifted amplified intensity-modulated optical signals.

The measurement loop 154 receives the phase shifted amplified intensity-modulated signals. The photodetector 113 converts the phase shifted amplified intensity-modulated optical signals to electrical signals. The frequency shifts of the electrical signals vary based on the phase shifts generated within sensing zone by the changes in the medium. The electrical amplifier 118 amplifies the electrical signals. The tunable bandpass filter 120 and a variable electrical phase shifter 122 filters the amplified, electrical signals. The spectrum analyzer 124 receives the amplified, filtered, electrical signals and generates a frequency spectrum of the amplified, filtered, electrical signals.

The amplified, filtered, electrical signals are used for modulating the power supplied to the laser diode 102. In aspects, a frequency selected by the tunable bandpass filter 120 modulates the power supply to the laser diode. The laser diode 102 generates intensity-modulated optical signals based on the modulated power supply. The first 50/50 directional coupler 104 receives the intensity-modulated optical signals from the laser diode 102 and the lengthened phase shifted amplified intensity-modulated signals from the phase shift loop 152. The first 50/50 directional coupler 104 combines the amplified intensity-modulated optical signals and the lengthened phase shifted amplified intensity-modulated optical signals into the optical sensing path. The amplified intensity-modulated optical signals and the lengthened phase shifted amplified intensity-modulated optical signals pass through the medium placed for test through the first collimating lens 106-1 to reach the second collimating lens 106-2. Changes in the properties of the medium are reflected as phase shifts, causing variations in RF frequency of the free space optical oscillator 100.

In some examples, the amplified intensity-modulated optical signals and the lengthened phase shifted amplified intensity-modulated optical signals are attenuated while passing through the medium. The SOA 110 receives from the second collimating lens 106-2, the attenuated amplified intensity-modulated optical signals and the lengthened phase shifted amplified intensity-modulated optical signals. The SOA 110 amplifies the received attenuated amplified intensity-modulated optical signals and the lengthened phase shifted amplified intensity-modulated optical signals. The second 50/50 directional coupler 112 divides the combined intensity-modulated optical signals and phase shifted amplified intensity-modulated optical signals into a first optical stream and a second optical stream. The second 50/50 directional coupler 112 injects the first optical stream onto the phase shift loop 152 and the second optical stream onto the measurement loop 154.

The measurement loop 154 receives the second optical stream. The photodetector 113 converts the first optical stream to electrical signals. The electrical amplifier 118 amplifies the electrical signals. The tunable bandpass filter 120 and the variable electrical phase shifter 122 filter the electrical signals. The electrical signals are received by the spectrum analyzer 124. The spectrum analyzer 124 generates the frequency spectrum of the electrical signals. The spectrum analyzer 124 determines the frequency shifts within the frequency spectrum of the electrical signals. The computing device 126 compares the frequency shifts to a look-up table configured to relate the frequency shifts related to the phase shifts generated within the sensing zone by the changes in the substance and identifies the change. For example, when the substance in the free space propagation region is a gas or perturbation is caused by change in density of gas, the computing device 126 identifies a chemical formula of the gas based on the frequency spectrum based on the frequency shifts in the frequency spectrum resulting from the changes in the density of the gas.

In another example, when the substance in the free space propagation region is a gas, and the perturbations in the free space propagation region are due to changes in a temperature of a gas the computing device 126 identifies a change in temperature of the gas based on the frequency spectrum based on the frequency shifts in the frequency spectrum resulting from the changes in the temperature of the gas.

The laser diode 102 may be modulated at higher frequencies for greater sensitivity and precision. The optical components (e.g., the SOA 110, the first 50/50 directional coupler 104 and the second 50/50 directional coupler 112 and the PZT fiber stretcher 116) are lightweight, making the system more portable. Also, the optical configuration is substantially immune to noise and surrounding interference, ensuring more reliable and accurate measurements in challenging environments.

Figure 2:
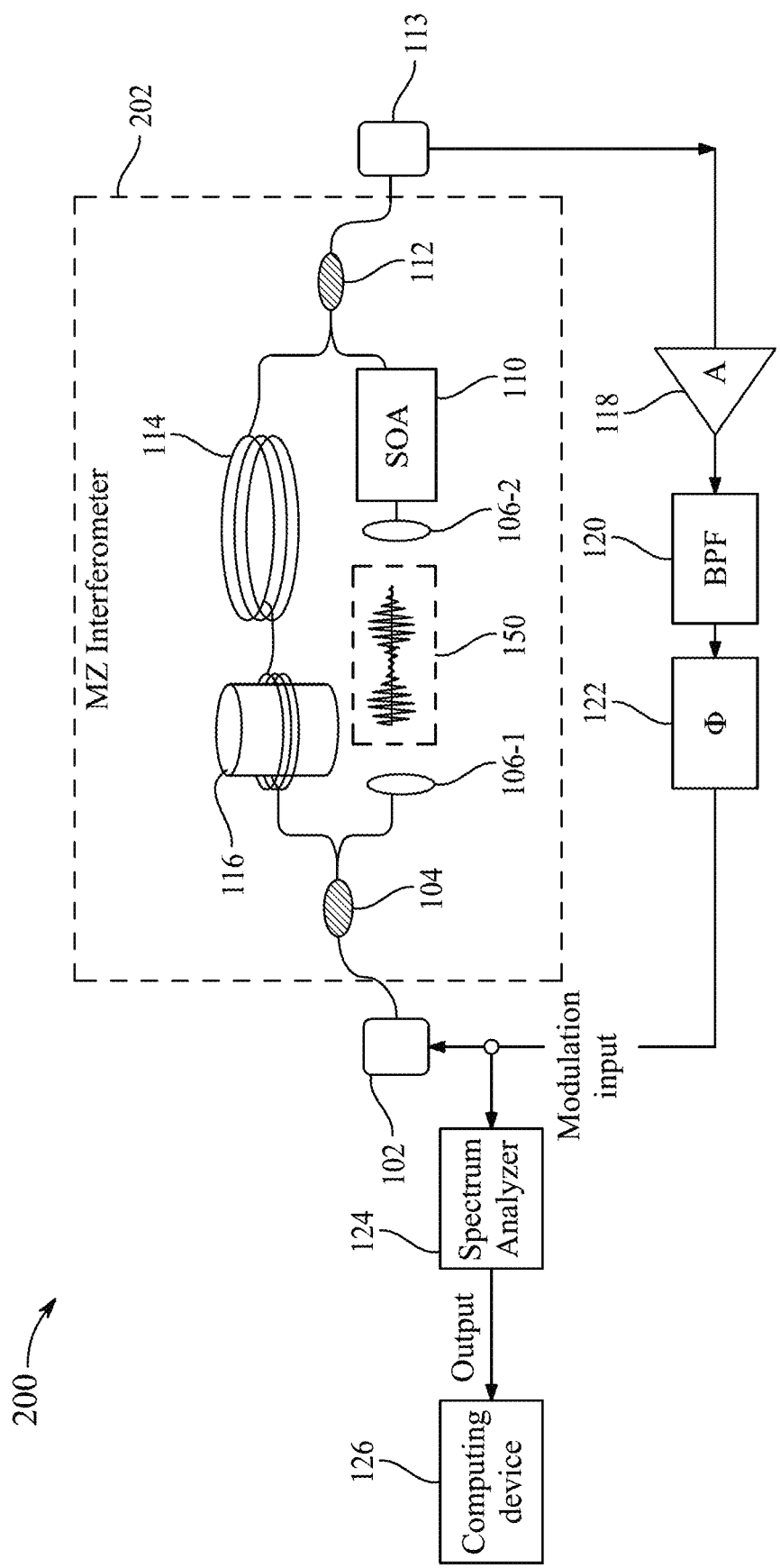
FIG. 2 illustrates an exemplary configuration of a free space optical oscillator where optical wave passes through a medium to be tested, according to certain embodiments.

FIG. 2 illustrates an exemplary configuration of a free space optical oscillator 200, which creates a parallel path to the free space path. As illustrated in FIG. 2, the configuration is slightly changed as compared to FIG. 1. In particular, the first 50/50 directional coupler 104 does not take two inputs as compared to FIG. 1. Instead, the first 50/50 directional coupler 104 receives the intensity-modulated optical signals from the laser diode 102, and divides the intensity-modulated optical signals into a first optical stream and a second optical stream. The first 50/50 directional coupler 104 injects the first optical stream into the phase shift loop and injects the second optical stream into the optical sensing path. The configuration comprising the first collimating lens 106-1, the second collimating lens 106-2, the free space propagation region 150 and the SOA 110 placement and operations remain the same as that of FIG. 1. The second 50/50 directional coupler 112 in FIG. 2 is configured to receive the amplified intensity-modulated optical signals from the SOA 110 and the phase shifted amplified intensity-modulated optical signals from the phase shift loop 152. The second 50/50 directional coupler 112 combines the amplified intensity-modulated optical signals and the phase shifted amplified intensity-modulated optical signals with the known phase shift into a single optical stream and injects the single optical stream into the measurement loop 154 (152 and 154 shown in FIG. 1). As shown in FIG. 2, the free space optical oscillator 200 has an additional parallel path alongside the primary free-space path. The additional path incorporates the fiber stretcher 116 which provides a phase shift adjusted during calibration. The two optical parallel paths (i.e., free space path and fiber stretcher (or guided) path) constitute a Mach-Zehnder (MZ) interferometer 202. A second oscillation path (between the photodetector 113 to laser diode 102) imposes an additional oscillation condition, enhancing the sensitivity of the system. The second oscillation condition forces the oscillator to change its oscillation frequency upon changes in the medium filling the free space region. The drift of the oscillation frequency reflects changes in medium properties. So, any changes in the properties of the medium filling the free-space region cause the drift in the frequency of the oscillator. The frequency shift, which reflects variations in the characteristics of the medium, is monitored and analyzed using the spectrum analyzer 124 or a mixer. The mixer has one input as a reference signal, determined during calibration to produce an output representing the frequency drift in oscillation frequency. A fiber coil can be added to the fiber stretcher 116 to increase oscillator immunity against phase noise. The configuration of FIG. 2 is advantageous for applications requiring precise detection of medium changes, as the combined paths enable greater control over oscillation dynamics and amplify sensitivity to environmental variations.

Figure 3:
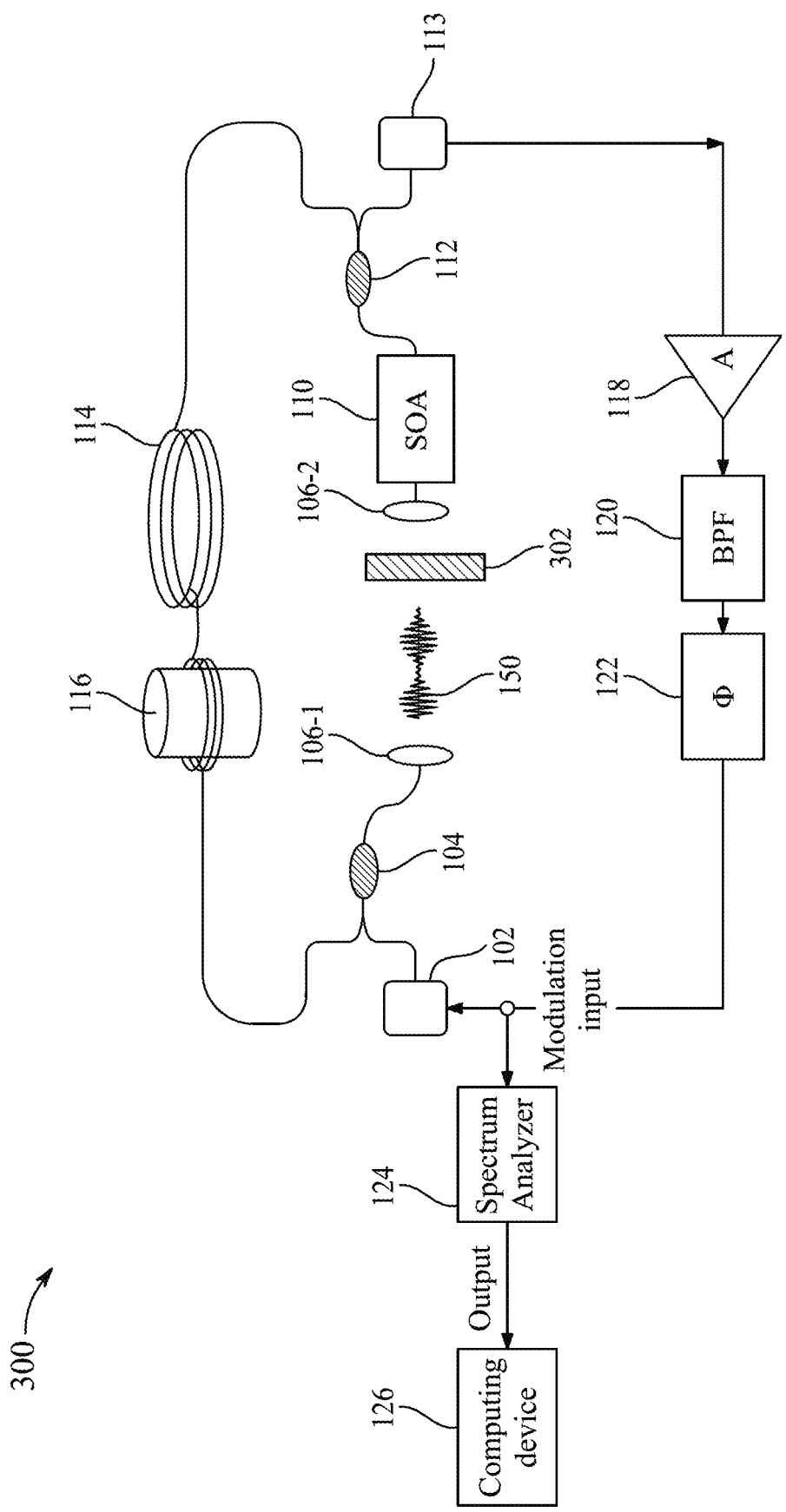
FIG. 3 illustrates an exemplary configuration for employing the free space optical oscillator for monitoring and controlling thickness of an object, according to certain embodiments.

FIG. 3 illustrates an exemplary configuration 300 for employing the free space optical oscillator 100 to monitor and control a thickness of the object. The construction of the free space optical oscillator 100 is same as that of the FIG. 1, except that a sample object 302 is used for measurement. As illustrated in FIG. 3, the free-space optical oscillator is used for real-time thickness monitoring and control of the object 302 in a manufacturing process. The free space optical oscillator 100 utilizes the measured shift in oscillation frequency to control the production of the product to meet thickness requirements. The object 302 is placed between the first collimating lens 106-1 and the second collimating lens 106-2. The output frequency of the free-space optical oscillator 300 is directly influenced by interaction of the optical wave with the object 302, allowing precise detection of thickness variations. The feedback may be used to dynamically adjust production process, ensuring the product meets the required thickness specifications.

To elaborate, if a slab is inserted in the free space region of this oscillator, according to the principle that this type of oscillator transforms changes in phase, which is experienced by a wave as it traverses the free space region, into changes in oscillation frequency given by following equation:

$$\frac{\omega_1 L}{v_{air}} = \frac{\omega_2(L-t)}{v_{air}} + \frac{\omega_2 t}{v_{slab}} \qquad (2)$$

where $\omega_1$ is the initial frequency of oscillations when the free space region of length L is filled with air, and $\omega_2$ is the new frequency of oscillations when a slab of thickness t is inserted into the free space region, and the speed of the wave in the medium of the slab is $v_{slab}$. The new oscillation frequency is given by following equation:

$$\omega_2 = \frac{\frac{\omega_1 L}{v_{air}}}{\left(\frac{L-t}{v_{air}} + \frac{t}{v_{slab}}\right)} \qquad (3)$$

Hence, the shift in oscillation frequency is expressed by equation 4, $$\delta f = f_2 - f_1 = \frac{f_1\left(\frac{t}{v_{air}} - \frac{t}{v_{slab}}\right)}{\left(\frac{L-t}{v_{air}} + \frac{t}{v_{slab}}\right)} \qquad (4)$$

Equation (4) describes the frequency drift of the oscillator caused by the insertion of a slab into the free-space region. This relationship enables the configuration to accurately measure thickness of the slab by analyzing the corresponding change in the oscillation frequency. The system with the free space oscillator can integrate seamlessly into manufacturing environments, offering greater accuracy, quick response times, and quality control for industrial production lines.

Figure 4:
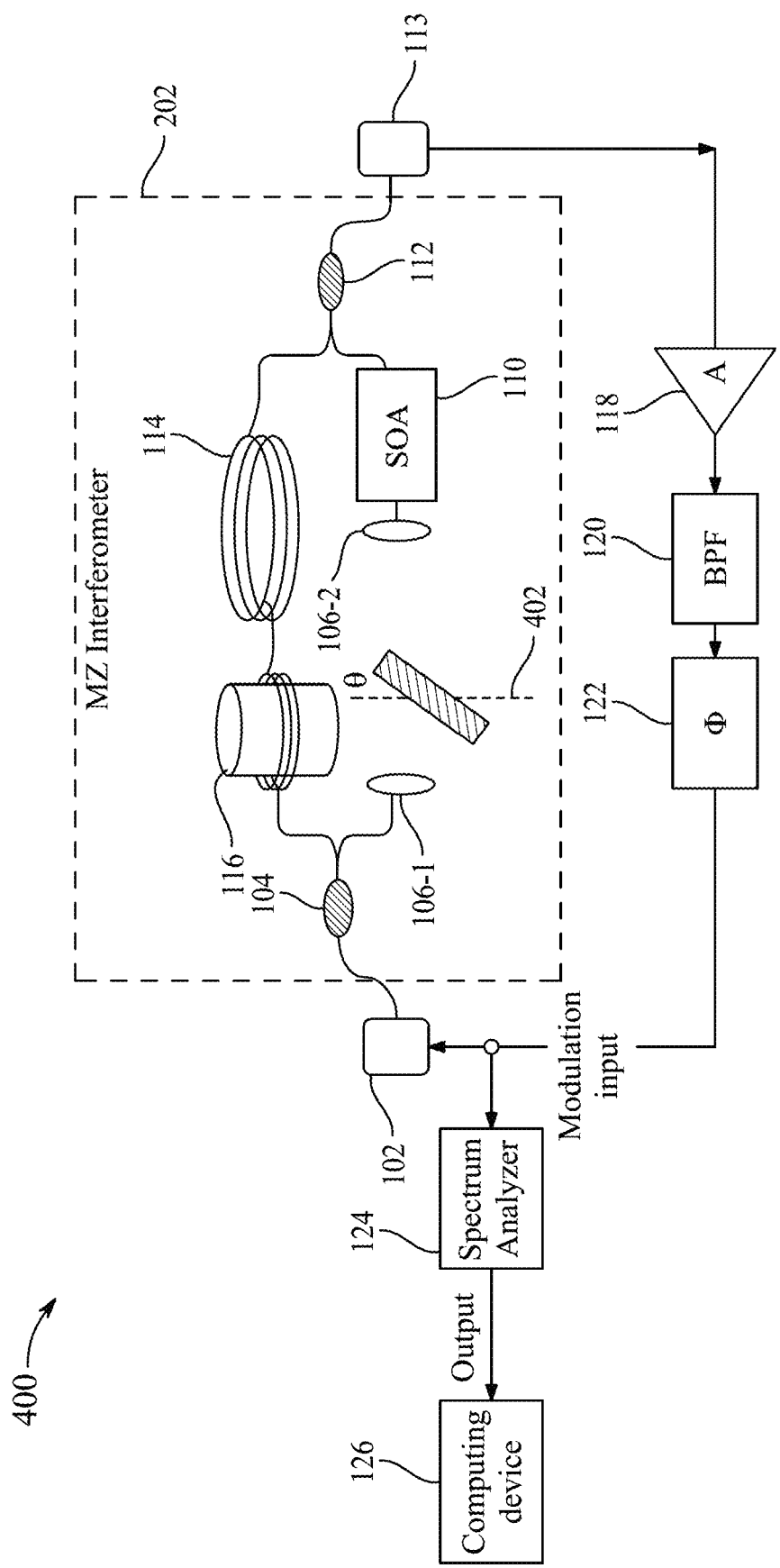
FIG. 4 illustrates an exemplary configuration of the free space optical oscillator for tilt angle measurement, according to certain embodiments.

FIG. 4 illustrates an exemplary configuration 400 of the free space optical oscillator for tilt angle measurement. The configuration of the free space optical oscillator is same as that of shown in FIG. 2. As illustrated in FIG. 4, a probe (e.g., transparent slab) 402 with known specifications is inserted into the free space propagation region 150. The free space optical oscillator 200 measures a tilt angle of the object. The optical path length of the probe alters as the tilt angle of the object changes. The variation in the optical path length causes the oscillation frequency of the free space optical oscillator to change accordingly.

The frequency shift directly relates to the tilt angle, allowing for precise and real-time angular displacement measurement. The configuration enables precise tilt angle measurement based on the observed frequency shift, making it suitable for high-resolution angular sensing applications. This configuration is used in applications that require high accuracy in detecting small changes in orientation or angle, such as in precision instrumentation, alignment systems, or angular sensors. Furthermore, the significant frequency shifts in response to environmental changes facilitate real-time monitoring and immediate detection of anomalies, essential for timely interventions in critical applications (e.g., structural health monitoring and process control).

Figure 5:
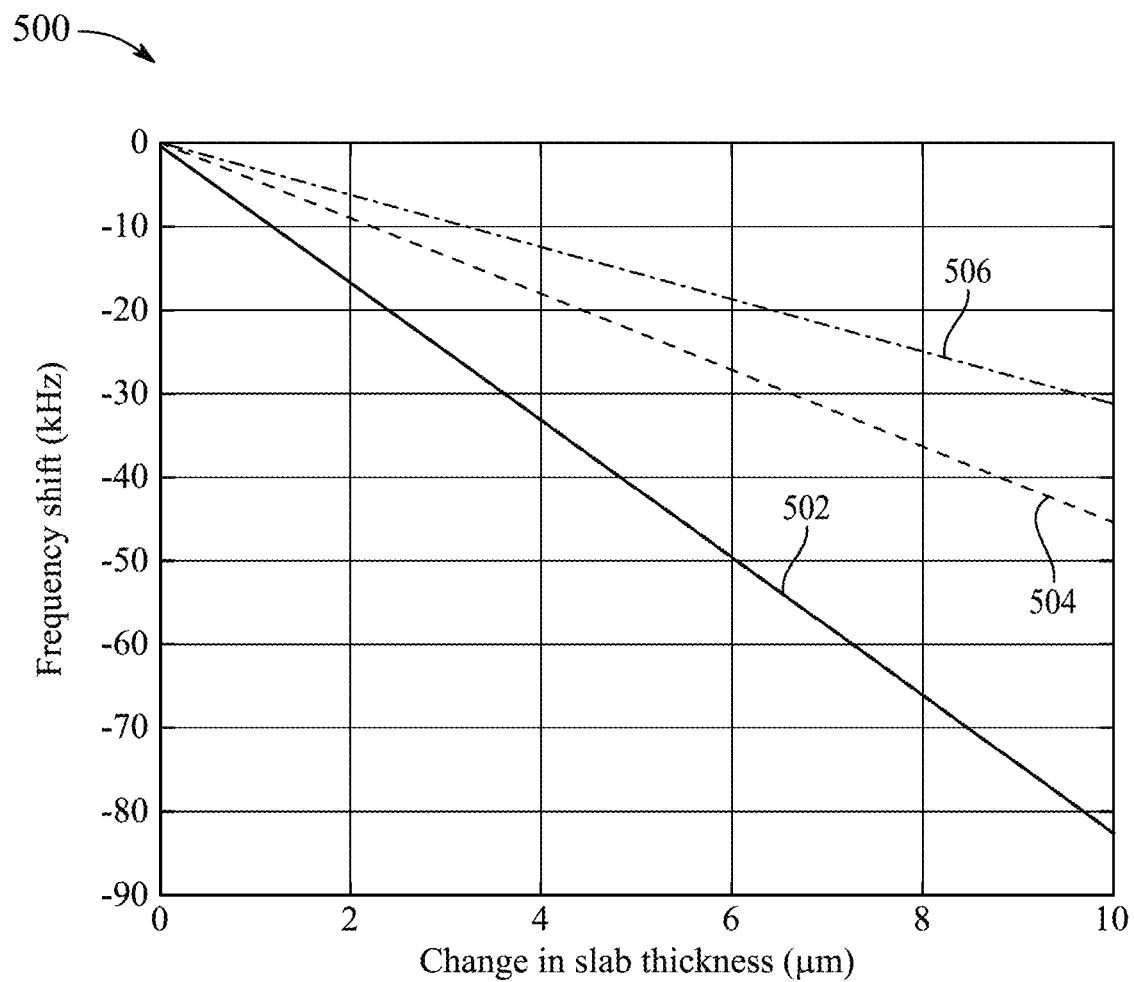
FIG. 5 illustrates a graph representing variation of an oscillation frequency of the free space optical oscillator when inserting a glass slab of varying thickness for different free space cavity length, according to certain embodiments.

FIG. 5 illustrates a graph 500 representing the variation of the oscillation frequency of the free space optical oscillator when inserting a glass slab of varying thickness for different free space cavity lengths.

The graph shows how changes in the specific variable being measured by the sensor affect the RF frequency of the free space optical oscillator.

As illustrated in FIG. 5, the X-axis of the graph 500 represents changes in the slab thickness (μm) and the Y-axis represents the frequency shift (kHz). The curves 502, 504, 506 show the variation of the oscillation frequency of the free space optical oscillator 100 when the transparent slab (e.g., glass slab) of varying thickness for different free space cavity lengths (e.g., L=5 mm, 10 mm, 15 mm), respectively is inserted in the free space path. The shorter the optical cavity length, the higher the change in oscillation frequency. The maximum frequency change sensitivity is 82 kHz/10 μm. The configuration provides a suitable choice for thickness measurement in factories in place of radioactive materials. The free space optical oscillator 100 represents an advanced configuration in which an optical wave propagates through a medium under test. In the free space optical oscillator 100, the RF frequency is monitored to detect any changes in the free space propagation region 150. The free space optical oscillator 100 shows exceptional sensitivity to variations in the thickness of the slab inserted in the free space region. A slope of about 8.2 kHz/μm is observed.

In an aspect, the free space optical oscillator 100 generates high-frequency oscillations (e.g., >100 MHZ), allowing for the detection of very small changes in physical parameters. For example, a 10 μm change in slab thickness measurement induces a significant 80 kHz shift in oscillation frequency, employing free space optical oscillators, and demonstrating significant sensitivity. The integrated dual feedback loop enhances the sensitivity of the system by amplifying minor phase shifts caused by environmental changes, ensuring precise and reliable measurements even for minute variations.

Figure 6:
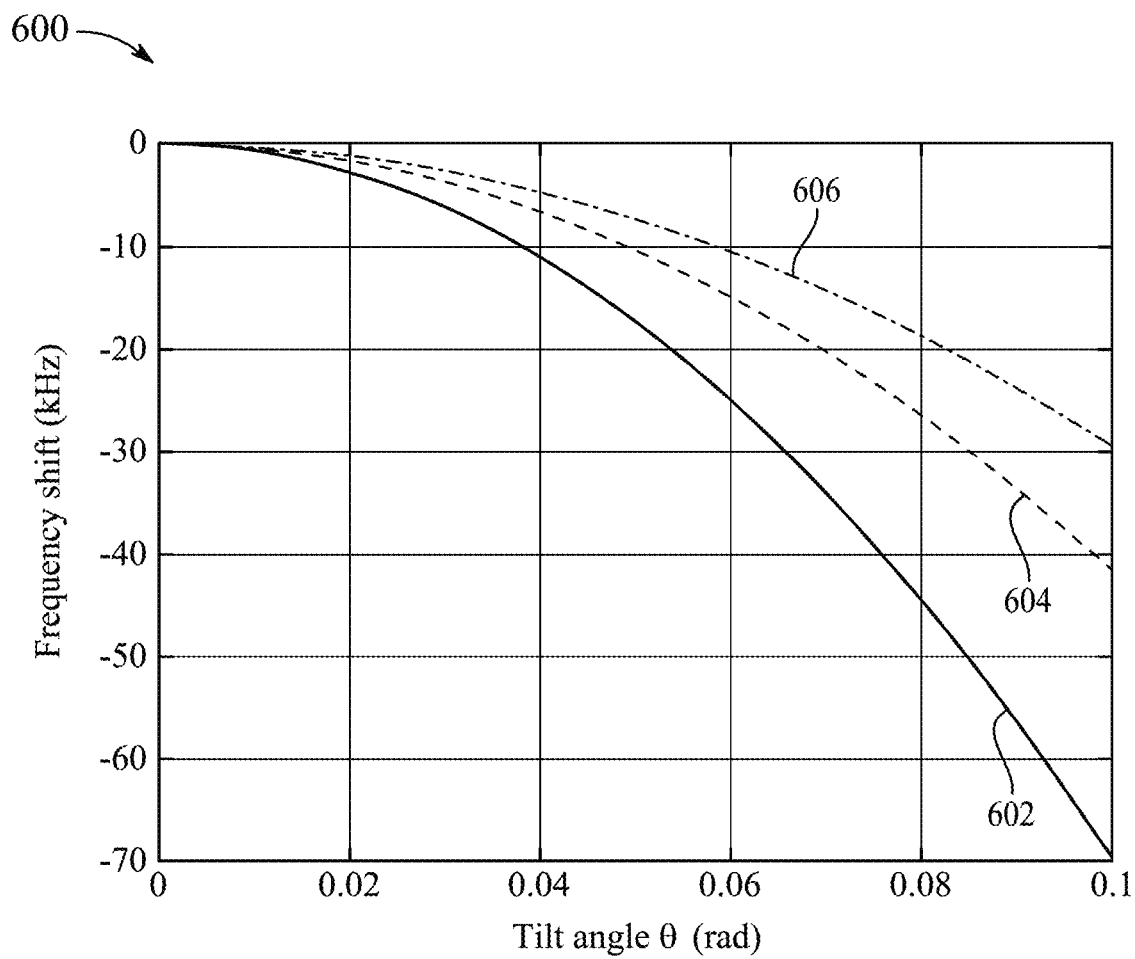
FIG. 6 illustrates a graph representing oscillation frequency change as a function of variations in a probe tilt angle, according to certain embodiments.

FIG. 6 illustrates a graph 600 representing the oscillation frequency change as a function of variations in a probe tilt angle.

As illustrated in FIG. 6, X-axis of the graph 600 represents tilt angle (e) rad and Y-axis represents frequency shift (kHz). The curves 602, 604, 606 show the oscillation frequency changes as a function of variations in probe tilt angle. The relation between the slopes exhibits a nonlinear behavior with a maximum change in oscillation frequency of 70 kHz for a 0.1 rad tilting angle. Probe slab width equals 20 mm and optical wave speed in slab medium equals 1.5×108 m/s where its speed in the remaining space of the free space region of the oscillator equals 3×108 m/s. The optical RF frequency is initially adjusted to 100 MHz. The sensitivity to tilt angle increases by choosing the slab with higher refractive index to discriminate much between the speed of the optical wave in air and in the medium of the probe.

Figure 7:
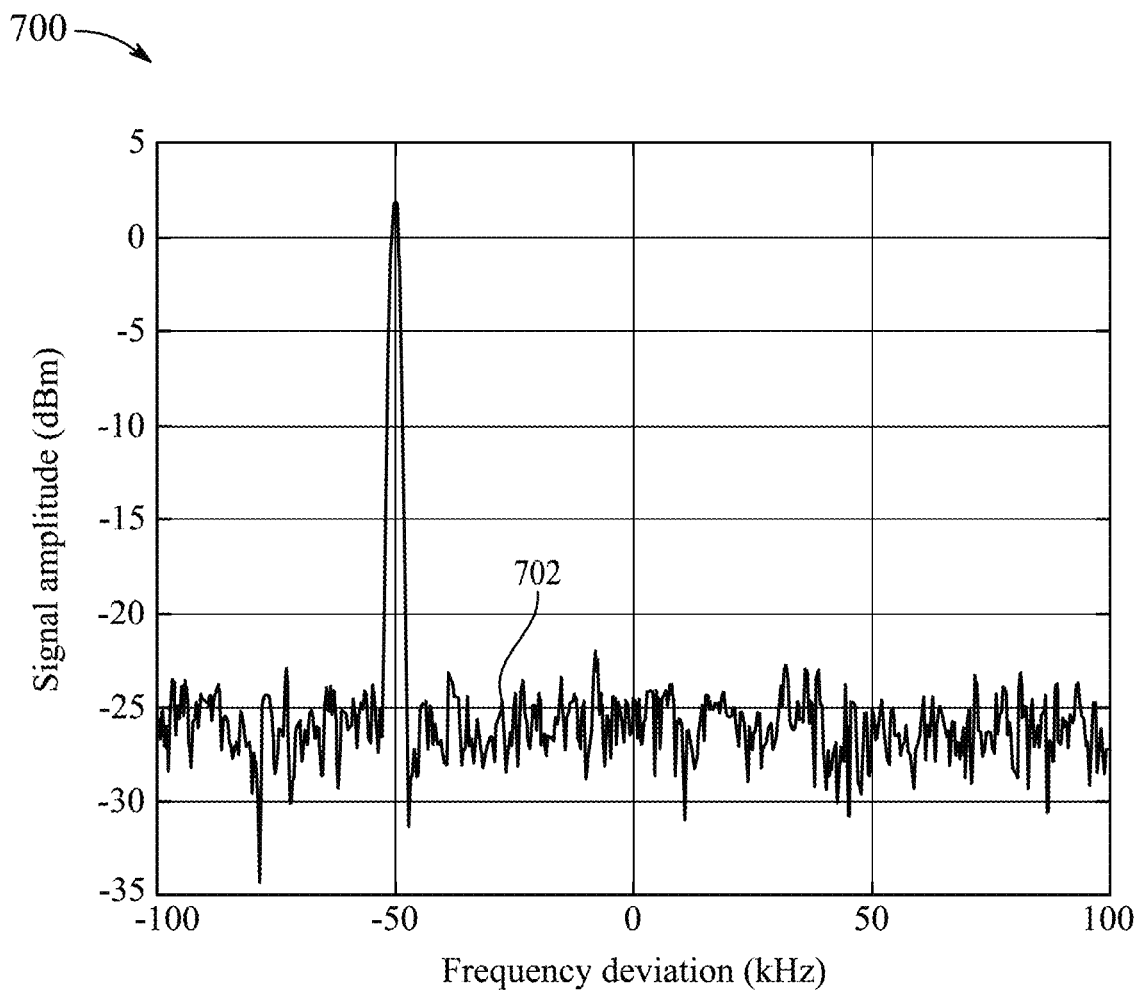
FIG. 7 illustrates a graph representing deviations in the oscillation frequency, according to certain embodiments.

As illustrated in FIG. 7, the free space optical oscillator 100 has excellent sensitivity to tilt angle variations, where a 0.1 rad deviation in angle of the slab, with respect to an initial vertical direction, shifts oscillation frequency by 70 kHz. Thickness measurements are simpler and more cost-effective with the free space optical oscillator 100 than conventional optical interferometric systems, which require intricate spectral analysis with high-resolution capabilities. The free space optical oscillator 100 achieves precision without the complexity or expense of such methods.

The free space optical oscillator 100 uses semiconductor lasers to enhance measurement resolution at high frequencies. The optical components offer resilience against environmental noise, vibrations, and mechanical interference, ensuring reliable performance in demanding conditions. The inherently lightweight nature of the optical components/elements reduces the bulk of the system, enhancing portability and ease of integration into various applications.

The free space optical oscillator 100 may be used for applications (e.g., optical sensing, environmental monitoring, and material testing within the optical wavelength range). Unique combination of free-space optical propagation, high-frequency stability, and advanced feedback control distinguishes the free space optical oscillator 100 as a powerful and versatile platform for next-generation measurement and testing technologies.

Further, the free space optical oscillator 100 provides angular position sensing, with the potential to significantly improve measurements in the field of gyroscope technology. Conventional gyroscopes are designed to attain high sensitivity, often focusing on detecting very small angular velocities, such as 10°/h (approximately 0.003 rad/sec).

The free space optical oscillator 100 has been tested to detect a frequency shift of 2.1 kHz with an angular displacement of 0.003 rad over a 1-second period. The sensitivity level of the system showcases indicates capability to measure even the smallest angular velocities precisely.

The free space optical oscillator 100 has been tested for a rapid response and a settling time of less than 1 second. The rapid stabilization enables the system with the free space optical oscillator to operate at sensitivity levels much lower than the 10/h threshold, positioning it as a competitive alternative to conventional gyroscopes. The free space optical oscillator 100 may be used in gyroscopic applications for high-precision angular position sensing in industries (e.g., aerospace, robotics, and navigation systems).

FIG. 7 illustrates a graph 700 representing deviations in the oscillation frequency.

As illustrated in FIG. 7, the X-axis of the graph 700 represents frequency deviations (kHz) and Y-axis represents signal amplitude (dBm). The graph 700 shows frequency deviations 702 in the oscillation frequency.

A 50 kHz deviation in oscillation frequency indicates the tilt by 5° of a glass plate of thickness equal to 20 mm where the free space region length of a free space optical oscillator is adjusted to 50 mm and the initial RF frequency is adjusted to 100 MHz. The spectrum analyzer resolution bandwidth is RBW=1 kHz, and the video bandwidth is VBW=1 kHz The free space optical oscillator 100 is used for tilt angle measurements. The slab is tilted by 5°, resulting in a 50 kHz shift in oscillation frequency, which agrees well with simulation results. This observed sensitivity makes the free space optical oscillator 100 useful in many applications in diverse fields.

The free space optical oscillator may be applied in precision measurements where the free space optical oscillator amplifies small phase variations in the propagating wave due to environmental or material changes. The amplified phase variations are converted into significant frequency shifts. This transformation enhances the sensitivity of the detection system beyond the capabilities of traditional amplitude or phase measurement-based sensors.

The free space optical oscillator 100 may be used in temperature sensing using free-space propagation. The free-space oscillator demonstrates high sensitivity to temperature variations, in which the oscillation frequency deviates proportionally with changes in thermal properties of the medium. The linear relationship between temperature shifts and frequency response confirms its suitability for precision thermal monitoring.

The free space optical oscillator may be used in gas density monitoring. The free space optical oscillator accurately detects variations in gas properties by using the dependence of wave propagation on medium density. The density fluctuations cause measurable frequency shifts in free space optical oscillator, enabling applications in environmental and industrial monitoring.

The free space optical oscillator may be used in tilt angle detection for structural applications. A tilted slab is inserted in the free-space path to measure angular displacement that highlights the relationship between the tilt angle of the slab and the frequency of the oscillator, showcasing its application in structural stability and inclination measurements.

The free space optical oscillator may be used material thickness measurement during production process. The free-space optical oscillator detects changes in material thickness by analyzing frequency deviations. A minute change in slab thickness induces a significant frequency shift, proving its capability as a high-resolution thickness sensor for quality control in manufacturing.

The free space optical oscillator employs a dual feedback mechanism. The dual feedback loop amplifies minor phase changes, ensuring reliable frequency shifts even for subtle environmental variations.

The free space optical oscillator provides high-frequency optical oscillation by integrating optical components, which allows for high-frequency operation (e.g., >10 MHz), improving noise immunity and enabling compact, lightweight designs.

The free space optical oscillator provides a non-radioactive, safer alternative to conventional sensors. The oscillator eliminates radiation risks by utilizing optical waves instead of nuclear radiation and offers a safer and more environmentally friendly alternative. The free space optical oscillator is useful in structural health monitoring and industrial quality control.

The first embodiment describes a free space optical oscillator system for sensing perturbations in optical signals transmitted through a free space propagation region. The free space optical oscillator comprises a laser diode 102 connected to a power source. The laser diode 102 is configured to generate intensity-modulated optical signals. A first 50/50 directional coupler 108 connected to the laser diode 102. The first 50/50 directional coupler 108 is configured to inject the intensity-modulated optical signals into an optical sensing path. A first collimating lens 106-1 is located on the optical sensing path and a second collimating lens 106-2 is located on the optical sensing path. A free space propagation region is located between the first collimating lens 106-1 and the second collimating lens 106-2. Changes in a substance located within a sensing zone of the free space propagation region generate phase shifts in the intensity-modulated optical signals. A semiconductor optical amplifier (SOA) 114 is connected to the second collimating lens 106-2. The SOA 110 is configured to amplify the phase shifted intensity-modulated optical signals. A second 50/50 directional coupler 112 is connected to the SOA 110. The second 50/50 directional coupler 112 is configured to receive the amplified phase shifted intensity-modulated optical signals. A phase shift loop is connected between the second 50/50 directional coupler 112 and the first 50/50 directional coupler 108. The phase shift loop includes a in series with the PZT fiber stretcher 116. The PZT fiber stretcher 116 is configured to insert a fixed phase shift into the amplified phase shifted intensity-modulated optical signals. A measurement loop is connected between the second 50/50 directional coupler 112 and the laser diode 102. The measurement loop includes a photodetector 113 configured to convert the phase shifted amplified intensity-modulated optical signals to electrical signals, and an electrical amplifier 118, a tunable bandpass filter 120 and a variable electrical phase shifter 122 configured to amplify and filter the electrical signals. A spectrum analyzer 124 is connected to the measurement loop. The spectrum analyzer 124 is configured to receive the amplified, filtered, electrical signals, generate a frequency spectrum, and determine one or more frequency shifts between the amplified, filtered, electrical signals and a reference frequency. A computing device 126 is connected to the spectrum analyzer 124. The computing device 126 includes an electrical circuitry, a memory having program instructions stored therein that, when executed by one or more processors, cause the one or more processors to receive the frequency shifts and the frequency spectrum, compare the one or more frequency shifts to a look-up table configured to relate the one or more of the frequency shifts to the phase shifts generated within the sensing zone by the changes in the substance, and identify the changes in the substance.

In an aspect, the PZT fiber stretcher 116 includes an optical fiber wound around a piezoelectric tube and a voltage source connected to the piezoelectric tube. The piezoelectric tube is configured to inject the fixed phase shift into the phase shift loop by expanding a path length of the optical fiber by increasing in diameter based on a magnitude of a voltage applied by the voltage source to the piezoelectric tube.

In an aspect, the fiber delay line 114 is configured to inject the fixed phase shift into the phase shift loop.

In an aspect, the amplified, filtered, electrical signals from the measurement loop are configured to modulate the power from the power source applied to the laser diode 102.

In an aspect, the first 50/50 directional coupler 108 is configured to receive the intensity-modulated optical signals from the laser diode 102 and the phase shifted amplified intensity-modulated optical signals from the phase shift loop, combine the intensity-modulated optical signals and the phase shifted amplified intensity-modulated optical signals, and inject the combined intensity-modulated optical signals and phase shifted amplified intensity-modulated optical signals into the optical sensing path.

In an aspect, the second 50/50 directional coupler 112 is configured to divide the amplified intensity-modulated optical signals into a first optical stream and a second optical stream, inject the first optical stream into the phase shift loop and inject the second optical stream into the measurement loop.

In an aspect, the perturbations in the free space path are due to changes in a density of a gas located in the free space propagation region of the optical sensing path. The computing device 126 is configured to identify a chemical formula of the gas based on the frequency spectrum and identify the changes in the density of the gas based on the frequency shifts.

In an aspect, the perturbations in the free space path are due to changes in a temperature of a gas located in the free space propagation region of the optical sensing path. The computing device 126 is configured to identify the changes in temperature of the gas based on the frequency shifts.

In an aspect, an object 402 is located in the free space path. The object 402 has a varying thickness. The computing device 126 is configured to identify a change in the thickness of the object 402 based on the frequency shifts.

In an aspect, the first 50/50 directional coupler 108 is configured to receive the intensity-modulated optical signals from the laser diode 102 and divide the intensity-modulated optical signals into a first optical stream and a second optical stream, inject the first optical stream into the phase shift loop and inject the second optical stream into the optical sensing path.

In an aspect, the second 50/50 directional coupler 112 is configured to receive the amplified intensity-modulated optical signals from the SOA 110 and the phase shifted amplified intensity-modulated optical signals from the phase shift loop, combine the amplified intensity-modulated optical signals and the phase shifted amplified intensity-modulated optical signals with the known phase shift into a single optical stream, and inject the single optical stream into the measurement loop.

In an aspect, the perturbations in the free space path are due to changes in a density of a gas located in the sensing zone. The computing device is configured to identify a chemical formula of the gas based on the frequency spectrum and identify the change in density based on the frequency shifts.

In an aspect, an object 502 located in the free space path. The object 502 has a varying tilt angle. The computing device 126 is configured to identify the tilt of the object 502 based on the frequency shifts.

A second embodiment describes a method for sensing perturbations in a free space propagation region of a free space oscillator. The method comprises generating, by a laser diode 102 connected to a power source, intensity-modulated optical signals and injecting, with a first 50/50 directional coupler 108 connected to the laser diode 102, the intensity-modulated optical signals onto an optical sensing path. The method further comprises transmitting, through a first collimating lens 106-1 located on the optical sensing path, the intensity-modulated optical signals into the free space propagation region. Changes in a substance located within a sensing zone of the free space propagation region generate phase shifts in the intensity-modulated optical signals. The method comprises receiving, by a second collimating lens 106-2 located on the optical sensing path at a position downstream of the free space free space propagation region, the phase shifted intensity-modulated optical signals and receiving and amplifying, by a semiconductor optical amplifier (SOA) 114 connected to the second collimating lens, the phase shifted intensity-modulated optical signals. The method comprises receiving, by a second 50/50 directional coupler 112 connected to the SOA 110, the amplified phase shifted intensity-modulated optical signals and injecting, by the second 50/50 directional coupler 112, the amplified phase shifted intensity-modulated optical signals into a phase shift loop connected between the second 50/50 directional coupler 112 and the first 50/50 directional coupler 108. The method comprises injecting, by a fiber delay line 114 in series with the PZT fiber stretcher 116 in the phase shift loop, a fixed phase shift into the phase shifted amplified intensity-modulated optical signals and receiving, by a measurement loop connected between the second 50/50 directional coupler 112 and the laser diode 102, the phase shifted amplified intensity-modulated signals. The method comprises converting, by a photodetector 113 located in the measurement loop, the phase shifted amplified intensity-modulated optical signals to electrical signals, wherein frequency shifts of the electrical signals vary based on the phase shifts generated within the sensing zone by the changes in the substance and amplifying, by an electrical amplifier 118, the electrical signals. The method comprises filtering, by a tunable bandpass filter 120 and a variable electrical phase shifter 122, the electrical signals and receiving, by a spectrum analyzer 124 connected to the measurement loop, the amplified, filtered, electrical signals. The method comprises generating, with the spectrum analyzer 124, a frequency spectrum of the amplified, filtered, electrical signals and determining, by the spectrum analyzer 124, the frequency shifts within the frequency spectrum. The method comprises receiving, by a computing device 126 including an electrical circuitry, a memory having program instructions stored therein that, and one or more processors configured to execute the program instructions, the frequency shifts. The method further comprises comparing, by the computing device 126, the frequency shifts to a look-up table configured to relate the frequency shifts to the phase shifts generated within the sensing zone by the changes in the substance and identifying the changes in the substance.

In an aspect, the method comprises modulating the power supplied to the laser diode 102 by the amplified, filtered, electrical signals.

In an aspect, the method further comprises receiving, by the first 50/50 directional coupler 108, the intensity-modulated optical signals from the laser diode 102 and the lengthened phase shifted amplified intensity-modulated signals from the phase shift loop. The method comprises combining the intensity-modulated optical signals and the lengthened phase shifted amplified intensity-modulated optical signals and injecting the combined intensity-modulated optical signals and the lengthened phase shifted amplified intensity-modulated signals into the optical sensing path. The method comprises dividing, by the second 50/50 directional coupler 112, the combined intensity-modulated optical signals and phase shifted amplified intensity-modulated optical signals into a first optical stream and a second optical stream, injecting the first optical stream onto the phase shift loop, and injecting the second optical stream onto the measurement loop.

In an aspect, the method further comprises when the substance in the sensing zone is a gas, identifying, by the computing device 126, a chemical formula of the gas based on the frequency spectrum, and one or more of changes in a density of the gas based on the frequency shifts in the frequency spectrum and changes in a temperature of the gas based on the frequency shifts in the frequency spectrum.

In an aspect, the method further comprises when the substance in the sensing zone is an object having a varying thickness, identifying, by the computing device 126, a change in the thickness of the object based on based on the frequency shifts in the frequency spectrum. In an aspect, the method further comprises receiving, by the first 50/50 directional coupler, the intensity-modulated optical signals from the laser diode 102 and dividing, by the first 50/50 directional coupler 108, the intensity-modulated optical signals into a first optical stream and a second optical stream. The method comprises injecting, by the first 50/50 directional coupler 108, the first optical stream into the phase shift loop and injecting, by the first 50/50 directional coupler 108, the second optical stream into the optical sensing path. The method comprises receiving, by the second 50/50 directional coupler 112, the amplified phase shifted intensity-modulated optical signals from the SOA 110 and the phase shifted amplified intensity-modulated optical signals with the known phase shift from the phase shift loop. The method comprises combining the amplified phase shifted intensity-modulated optical signals from the SOA 110 and the phase shifted amplified intensity-modulated optical signals with the known phase shift into a single optical stream and injecting the single optical stream into the measurement loop.

In an aspect, the method further comprises when the substance in the sensing zone is a gas, identifying, by the computing device 126, a chemical formula of the gas based on the frequency spectrum. One or more of changes in a density of the gas based on the frequency shifts in the frequency spectrum and changes in a temperature of the gas based on the frequency shifts in the frequency spectrum. When the substance in the sensing zone is an object having a varying tilt angle, identifying, by the computing device 126, the tilt angle of the object based on the frequency shifts.

The free space optical oscillator 100 uses optical waves instead of nuclear radiation. This eliminates the health risks associated with radiation exposure. It is a safer alternative for environments where human safety is paramount, such as manufacturing plants, construction sites, and residential areas. The absence of radioactive materials simplifies regulatory compliance, reducing operational barriers and enabling broader deployment across diverse sectors.

The free space optical oscillator 100 employs optical waves, the free-space propagation of optical waves, combined with the design of the system, provides inherent robustness against electromagnetic interference and other environmental noise. This ensures consistent performance across varied and challenging environments. Further, the free space optical oscillator can be easily scaled and adapted to different monitoring requirements by adjusting parameters (e.g., path length and frequency), making it suitable for various applications.

The robustness and stable performance of the free space optical oscillator 100 reduces a need for frequent maintenance and recalibration, enhancing its practicality for long-term deployment in industrial settings and lowering its operating costs.

Figure 8:
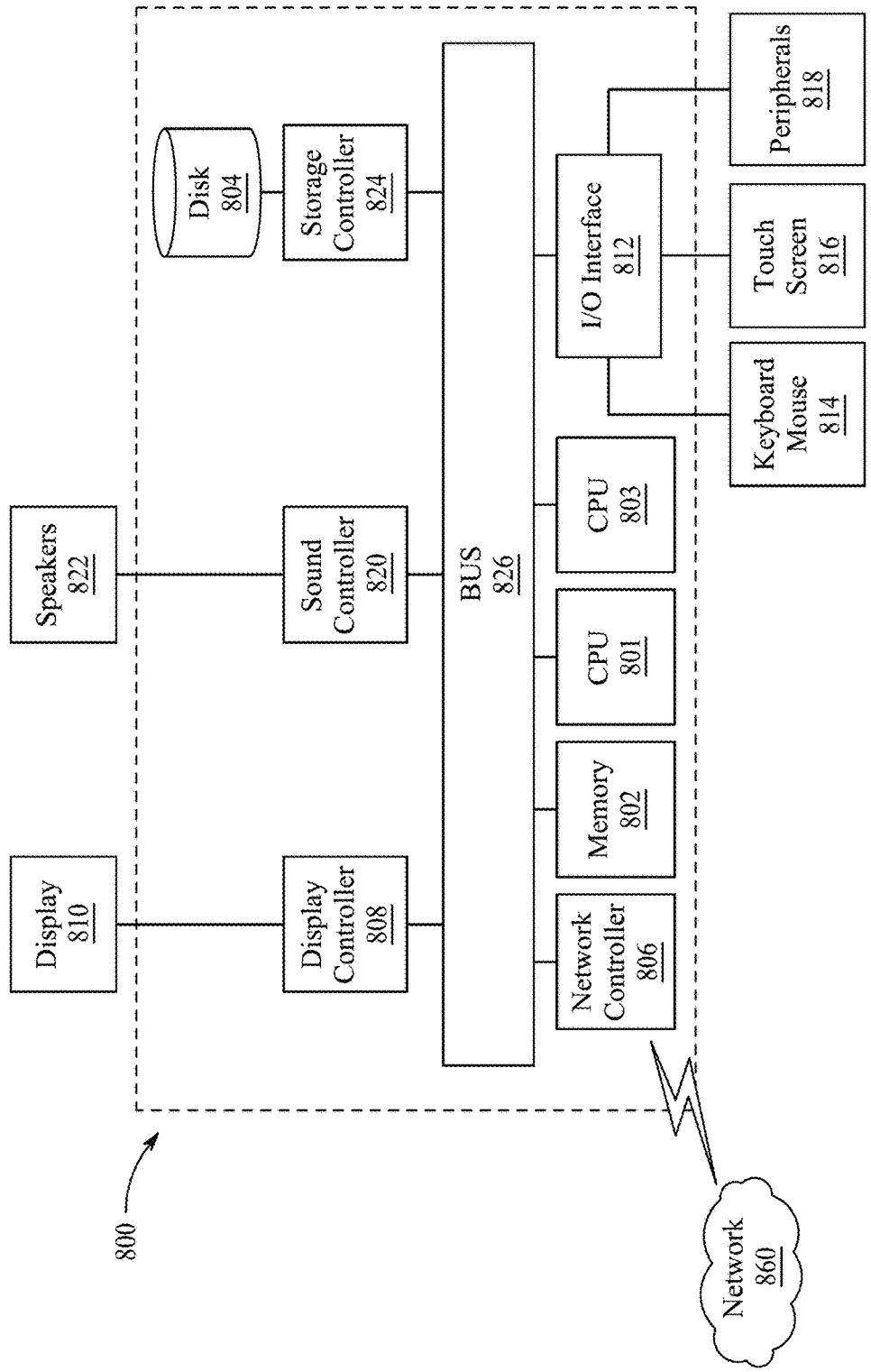
FIG. 8 is an illustration of a non-limiting example of details of computing hardware used in a computing device, according to certain embodiments.

Next, further details of the hardware description of the computing environment according to exemplary embodiments is described with reference to FIG. 8. In FIG. 8, the computing device 800 (representative of the computing device 126 as shown in FIG. 1-FIG. 4) is in communication with the spectrum analyzer 124 of the system and includes a Central Processing Unit (CPU) 801, which performs the processes described above/below. The process data and instructions may be stored in a memory 802. These processes and instructions may also be stored on a storage medium disk 804 such as a Hard Disk Drive (HDD) or a portable storage medium or may be stored remotely.

The claims are not limited by the form of the computer-readable media on which the instructions of the inventive process are stored. For example, the instructions may be stored on Compact Disks (CDs), Digital Versatile Discs (DVDs), in a Flash memory, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), a hard disk or any other information processing device with which the computing device communicates, such as a server or a computer.

The claims may be provided as a utility application, background daemon, or component of an operating system, or combination thereof, executing in conjunction with the CPU 801, a CPU 803 and an operating system such as a Microsoft Windows 7, a Microsoft Windows 9, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 801 or the CPU 803 may be a Xenon or a Core processor from Intel of America or an Opteron processor from Advanced Micro Devices (AMD) of America, or may be other processor types that would be recognized by one of ordinary skill in the art. Alternatively, the CPU 801, the CPU 803 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. The CPU 801, the CPU 803 may be implemented as multiple processors cooperatively working in parallel to perform the instructions of the inventive processes described above.

The computing device in FIG. 8 also includes a network controller 806, such as an Intel Ethernet Professional (PRO) network interface card from an Intel Corporation of America, for interfacing with a network 860. As can be appreciated, the network 860 can be a public network, such as the Internet, or a private network such as a Local Area Network (LAN) or a Wide Area Network (WAN), or any combination thereof and can also include a Public Switched Telephone Network (PSTN) or an Integrated Services Digital Network (ISDN) sub-networks. The network 860 can also be wired, such as an Ethernet network, or can be wireless such as a cellular network including EDGE, Third Generation (3G), Fourth Generation (4G), Fifth Generation (5G) or sixth Generation (6G) wireless cellular systems. The wireless network can also be a WiFi, a Bluetooth, or any other wireless form of communication that is known.

The computing device further includes a display controller 808, such as a NVIDIA GeForce Giga Texel Shader eXtreme (GTX) or a Quadro graphics adaptor from a NVIDIA Corporation of America for interfacing with a display 810, such as a Hewlett Packard HPL2445w Liquid Crystal Display (LCD) monitor. A general purpose I/O interface 812 interfaces with a keyboard and/or mouse 814 as well as a touch screen panel 816 on or separate from display 810. The general purpose I/O interface 812 also connects to a variety of peripherals 818 including printers and scanners, such as an OfficeJet or DeskJet from HP.

A sound controller 820 is also provided in the computing device such as a Sound Blaster X-Fi Titanium from Creative, to interface with speakers/microphone 822 thereby providing sounds and/or music.

A general purpose storage controller 824 connects the storage medium disk 804 with a communication bus 826, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 810, keyboard and/or mouse 814, as well as the display controller 808, the general purpose storage controller 824, the network controller 806, the sound controller 820, and the general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
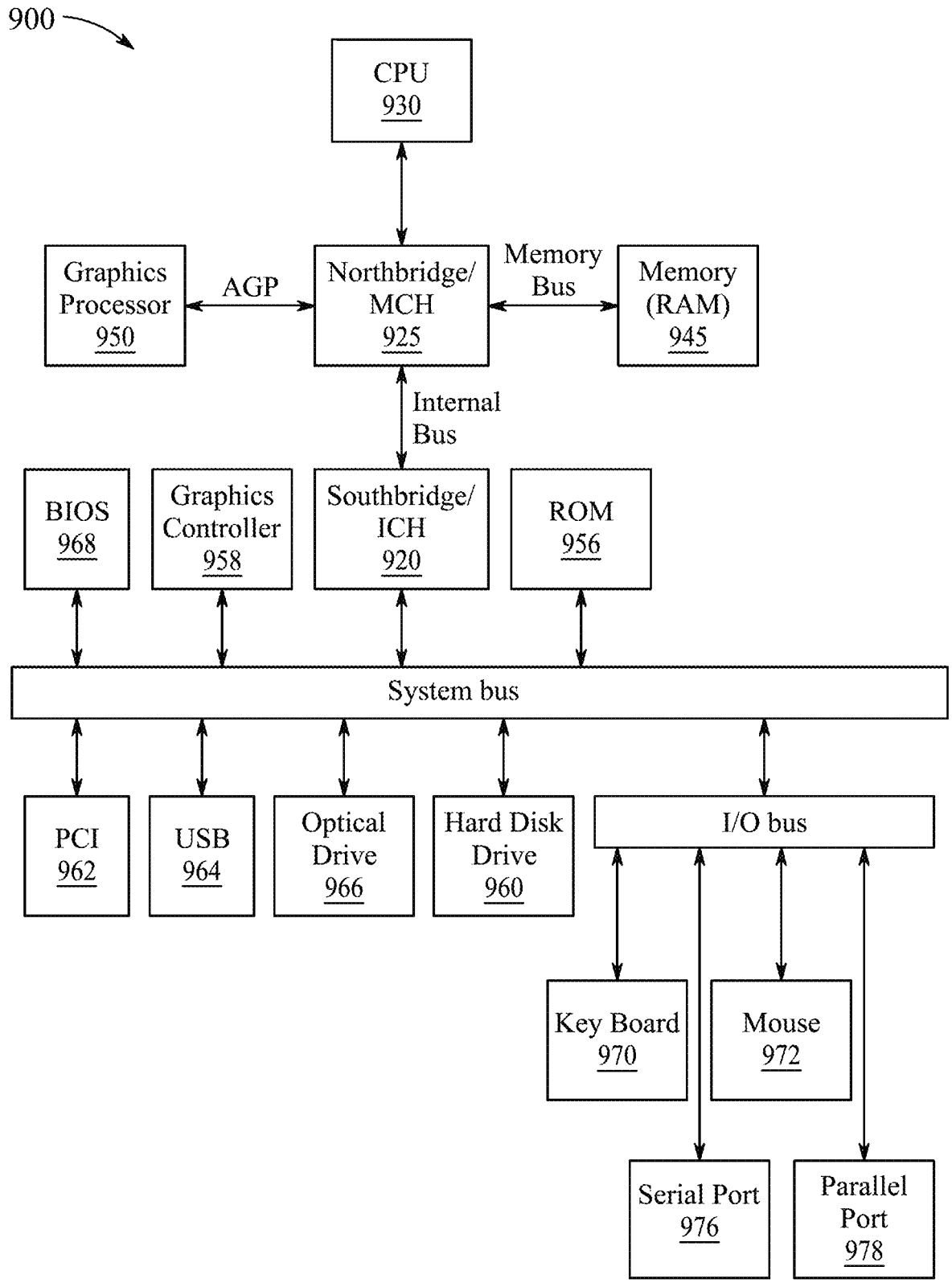
FIG. 9 is an exemplary schematic diagram of a data processing system used within the computing device, according to certain embodiments.

FIG. 9 shows a schematic diagram of a data processing system 900, for performing the functions of the exemplary embodiments. The data processing system 900 is an example of a computer in which code or instructions implementing the processes of the illustrative embodiments may be located.

In FIG. 9, the data processing system 900 employs a hub architecture including a North Bridge and a Memory Controller Hub (NB/MCH) 925 and a south bridge and an Input/Output (I/O) Controller Hub (SB/ICH) 920. The CPU 930 is connected to the NB/MCH 925. The NB/MCH 925 also connects to a memory 945 via a memory bus and connects to a graphics processor 950 via an Accelerated Graphics Port (AGP). The NB/MCH 925 also connects to the SB/ICH 920 via an internal bus (e.g., a unified media interface or a direct media interface). The CPU 930 may contain one or more processors and even may be implemented using one or more heterogeneous processor systems.

Figure 10:
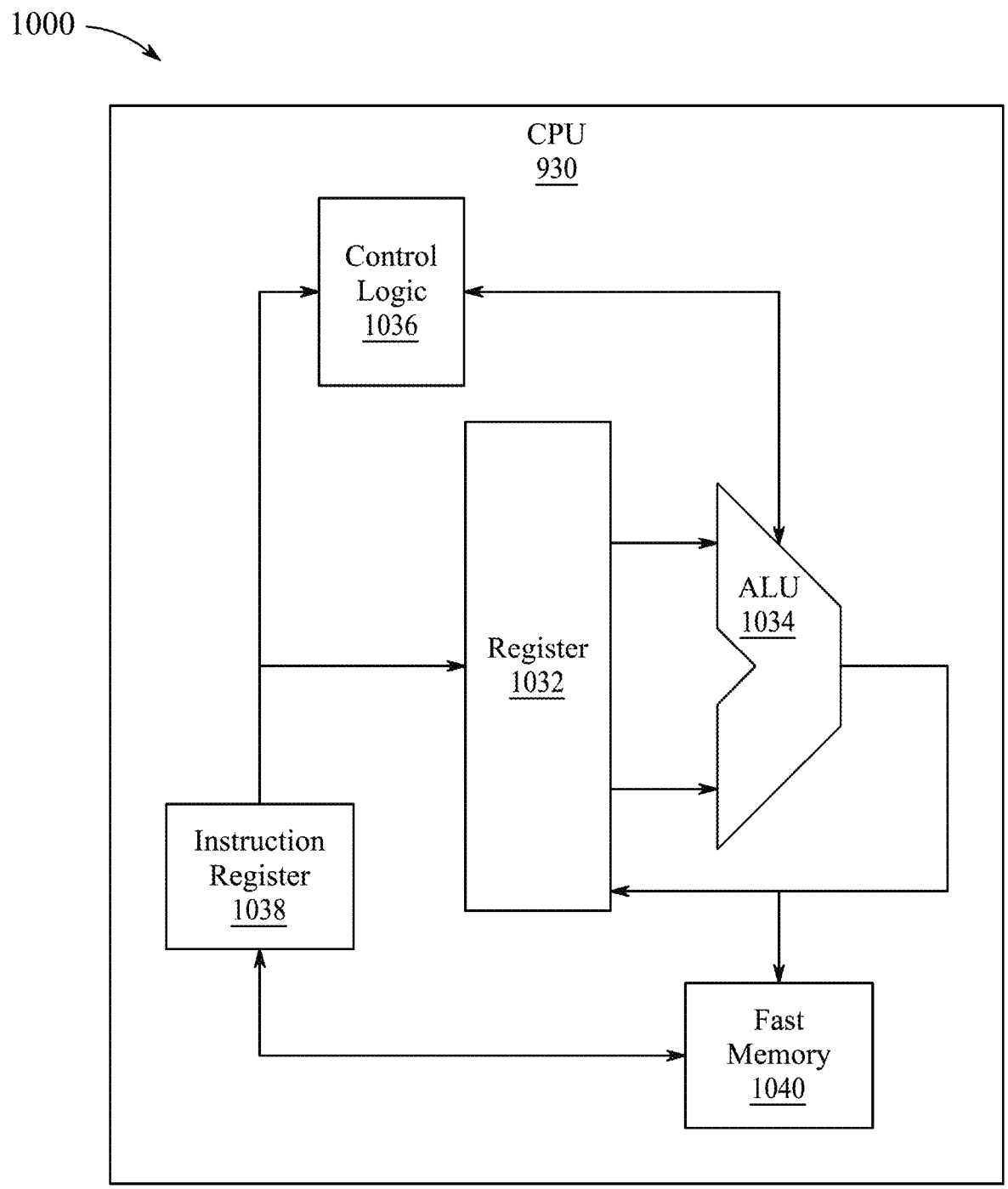
FIG. 10 is an exemplary schematic diagram of a processor used with the computing device, according to certain embodiments.

For example, FIG. 10 shows one implementation of the CPU 930. In one implementation, an instruction register 1038 retrieves instructions from a fast memory 1040. At least part of these instructions is fetched from the instruction register 1038 by a control logic 1036 and interpreted according to the instruction set architecture of the CPU 1030. Part of the instructions can also be directed to a register 1032. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1034 that loads values from the register 1032 and performs logical and mathematical operations on the loaded values according to the instructions. The results from these operations can be feedback into the register 1032 and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on a Von Neuman model or a Harvard model. The CPU 930 can be a digital signal processor, a Field-Programmable Gate Array (FPGA), an Application-Specific Integrated Circuit (ASIC), a Programmable Logic Array (PLA), a Programmable Logic Device (PLD), or a Complex Programmable Logic Device (CPLD). The CPU 930 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 9, the data processing system 900 can include that the SB/ICH 920 is coupled through a system bus to an I/O Bus, a ROM 956, a Universal Serial Bus (USB) port 964, a flash Binary Input/Output System (BIOS) 968, and a graphics controller 958. Peripheral Component Interconnect/Peripheral Component Interconnect Express (PCI/PCIe) devices can also be coupled to SB/ICH 920 through a PCI bus 962.

The PCI devices may include, for example, Ethernet adapters, add-in cards, and Personal Computer (PC) cards for notebook computers. The HDD 960 and an optical drive 966 (e.g., CD-ROM) can use, for example, an Integrated Drive Electronics (IDE) or a Serial Advanced Technology Attachment (SATA) interface. In one implementation, an I/O bus can include a super I/O (SIO) device.

The HDD 960 and the optical drive 966 can also be coupled to the SB/ICH 920 through a system bus. In one implementation, a keyboard 970, a mouse 972, a serial port 976, and a parallel port 978 can be connected to the system bus through the I/O bus. Other peripherals and devices that can be connected to the SB/ICH 920 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
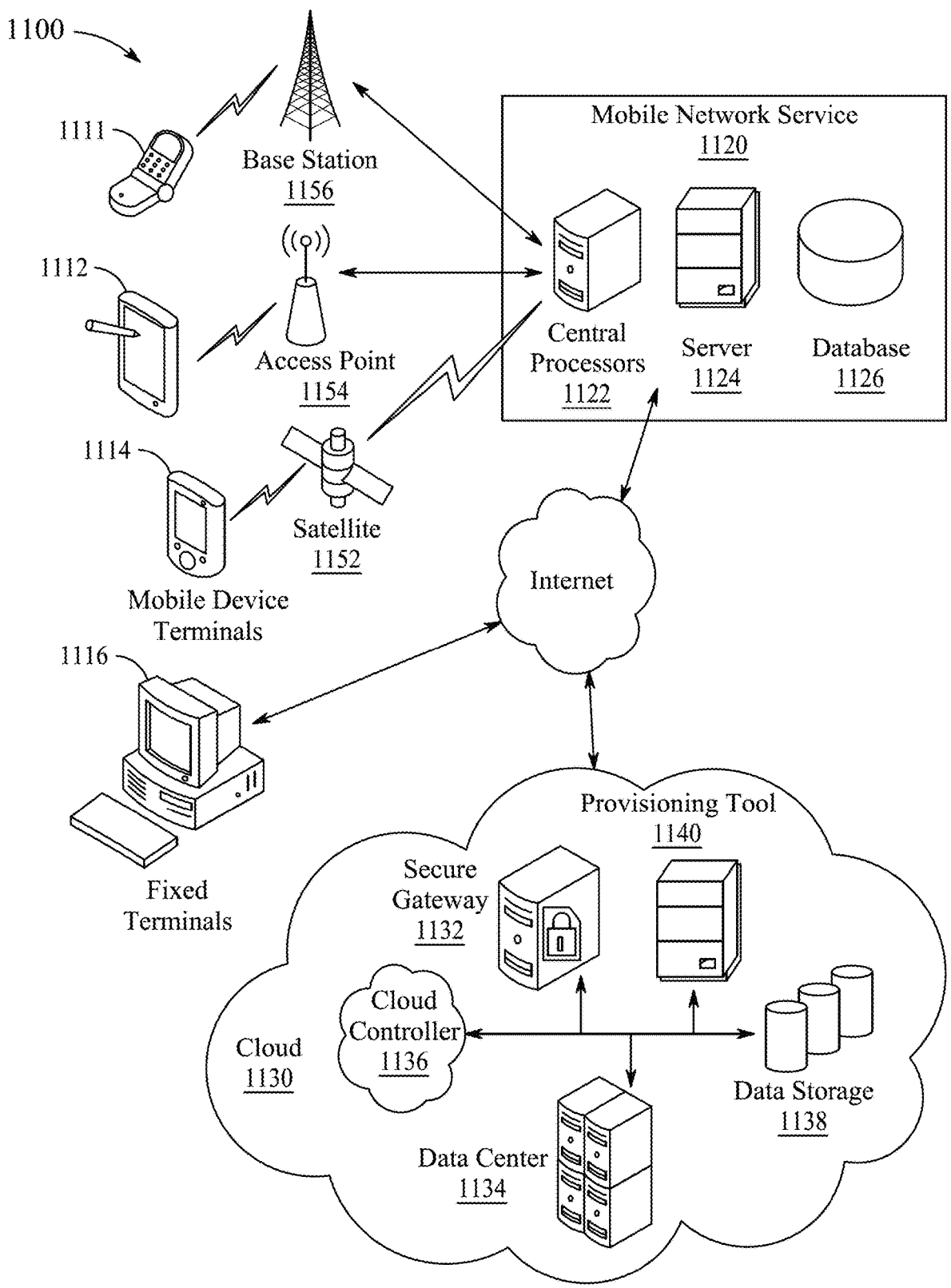
FIG. 11 is an illustration of a non-limiting example of distributed components which may share processing with the computing device, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). More specifically, FIG. 11 illustrates client devices including a smart phone 1111, a tablet 1112, a mobile device terminal 1114 and fixed terminals 1116. These client devices may be commutatively coupled with a mobile network service 1120 via a base station 1156, an access point 1154, a satellite 1152 or via an internet connection. The mobile network service 1120 may comprise central processors 1122, a server 1124 and a database 1126. The fixed terminals 1116 and the mobile network service 1120 may be commutatively coupled via an internet connection to functions in cloud 1130 that may comprise a security gateway 1132, a data center 1134, a cloud controller 1136, a data storage 1138 and a provisioning tool 1140. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be described.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A free space optical oscillator system for sensing perturbations in optical signals transmitted through a free space propagation region, comprising:
    a laser diode connected to a power source, wherein the laser diode is configured to generate intensity-modulated optical signals;
    a first 50/50 directional coupler connected to the laser diode, wherein the first 50/50 directional coupler is configured to inject the intensity-modulated optical signals into an optical sensing path;
    a first collimating lens located on the optical sensing path;
    a second collimating lens located on the optical sensing path;
    a free space propagation region located between the first collimating lens and the second collimating lens, wherein changes in a substance located within a sensing zone of the free space propagation region generate phase shifts in the intensity-modulated optical signals;
    a semiconductor optical amplifier (SOA) connected to the second collimating lens, wherein the SOA is configured to amplify the phase shifted intensity-modulated optical signals;
    a second 50/50 directional coupler connected to the SOA, wherein the second 50/50 directional coupler is configured to receive the amplified phase shifted intensity-modulated optical signals;
    a fiber delay line;
    a piezoelectric (PZT) fiber stretcher comprising an optical fiber wound around a piezoelectric tube and a voltage source connected to the piezoelectric tube, wherein the optical fiber is configured to increase in length based on a magnitude of a voltage applied by the voltage source to the piezoelectric tube;
    a phase shift loop connected between the second 50/50 directional coupler and the first 50/50 directional coupler, wherein the phase shift loop consists of the fiber delay line connected in series with the PZT fiber stretcher, wherein the fiber delay line is directly connected between the second 50/50 directional coupler and the PZT fiber stretcher and the PZT fiber stretcher is directly connected to the fiber delay line and the first 50/50 directional coupler, wherein the PZT fiber stretcher is configured to insert a preset phase shift into the amplified phase shifted intensity-modulated optical signals due to the increase in length of the optical fiber and the fiber delay line is configured to inject a fixed phase shift into the phase shift loop;
    a measurement loop connected between the second 50/50 directional coupler and the laser diode, wherein the measurement loop consists of a photodetector configured to convert the phase shifted amplified intensity-modulated optical signals to electrical signals, and an electrical amplifier, a tunable bandpass filter and a variable electrical phase shifter configured to amplify and filter the electrical signals;
    a spectrum analyzer connected to the measurement loop, wherein the spectrum analyzer is configured to receive the amplified, filtered, electrical signals, generate a frequency spectrum, and determine one or more frequency shifts between the amplified, filtered, electrical signals and a reference frequency; and
    a computing device connected to the spectrum analyzer, wherein the computing device includes an electrical circuitry, a memory having program instructions stored therein that, when executed by one or more processors, cause the one or more processors to:
    receive the one or more frequency shifts and the frequency spectrum,
    compare the one or more frequency shifts to a look-up table configured to relate the one or more frequency shifts to the phase shifts generated within the sensing zone by the changes in the substance, and
    identify the changes in the substance.

2. The free space optical oscillator system of claim 1, wherein the amplified, filtered, electrical signals from the measurement loop are configured to modulate the power from the power source applied to the laser diode.

3. The free space optical oscillator system of claim 2, wherein the first 50/50 directional coupler is configured to receive the intensity-modulated optical signals from the laser diode and the phase shifted amplified intensity-modulated optical signals from the phase shift loop, combine the intensity-modulated optical signals and the phase shifted amplified intensity-modulated optical signals, and inject the combined intensity-modulated optical signals and phase shifted amplified intensity-modulated optical signals into the optical sensing path.

4. The free space optical oscillator system of claim 3, wherein the second 50/50 directional coupler is configured to divide the amplified intensity-modulated optical signals into a first optical stream and a second optical stream, inject the first optical stream into the phase shift loop and inject the second optical stream into the measurement loop.

5. The free space optical oscillator system of claim 4, wherein:
the perturbations in the free space path are due to changes in a density of a gas located in the free space propagation region of the optical sensing path; and
the computing device is configured to identify a chemical formula of the gas based on the frequency spectrum and identify the changes in the density of the gas based on the one or more frequency shifts.

6. The free space optical oscillator system of claim 4, wherein:
the perturbations in the free space path are due to changes in a temperature of a gas located in the free space propagation region of the optical sensing path; and
the computing device is configured to identify the changes in temperature of the gas based on the one or more frequency shifts.

7. The free space optical oscillator system of claim 4, further comprising:
an object located in the free space path, wherein the object has a varying thickness,
wherein the computing device is configured to identify a change in the thickness of the object based on the one or more frequency shifts.

8. The free space optical oscillator system of claim 1, wherein the first 50/50 directional coupler is configured to:
receive the intensity-modulated optical signals from the laser diode; and
divide the intensity-modulated optical signals into a first optical stream and a second optical stream, inject the first optical stream into the phase shift loop and inject the second optical stream into the optical sensing path.

9. The free space optical oscillator system of claim 8, wherein the second 50/50 directional coupler is configured to:
receive the amplified intensity-modulated optical signals from the SOA and the phase shifted amplified intensity-modulated optical signals from the phase shift loop, combine the amplified intensity-modulated optical signals and the phase shifted amplified intensity-modulated optical signals with the known phase shift into a single optical stream; and
inject the single optical stream into the measurement loop.

10. The free space optical oscillator system of claim 9, wherein:
the perturbations in the free space path are due to changes in a density of a gas located in the sensing zone; and
the computing device is configured to identify a chemical formula of the gas based on the frequency spectrum and identify the change in density based on the one or more frequency shifts.

11. The free space optical oscillator system of claim 9, further comprising:
an object located in the free space path, wherein the object has a varying tilt angle,
wherein the computing device is configured to identify the tilt of the object based on the one or more frequency shifts.

* * * * *